Figure 1:
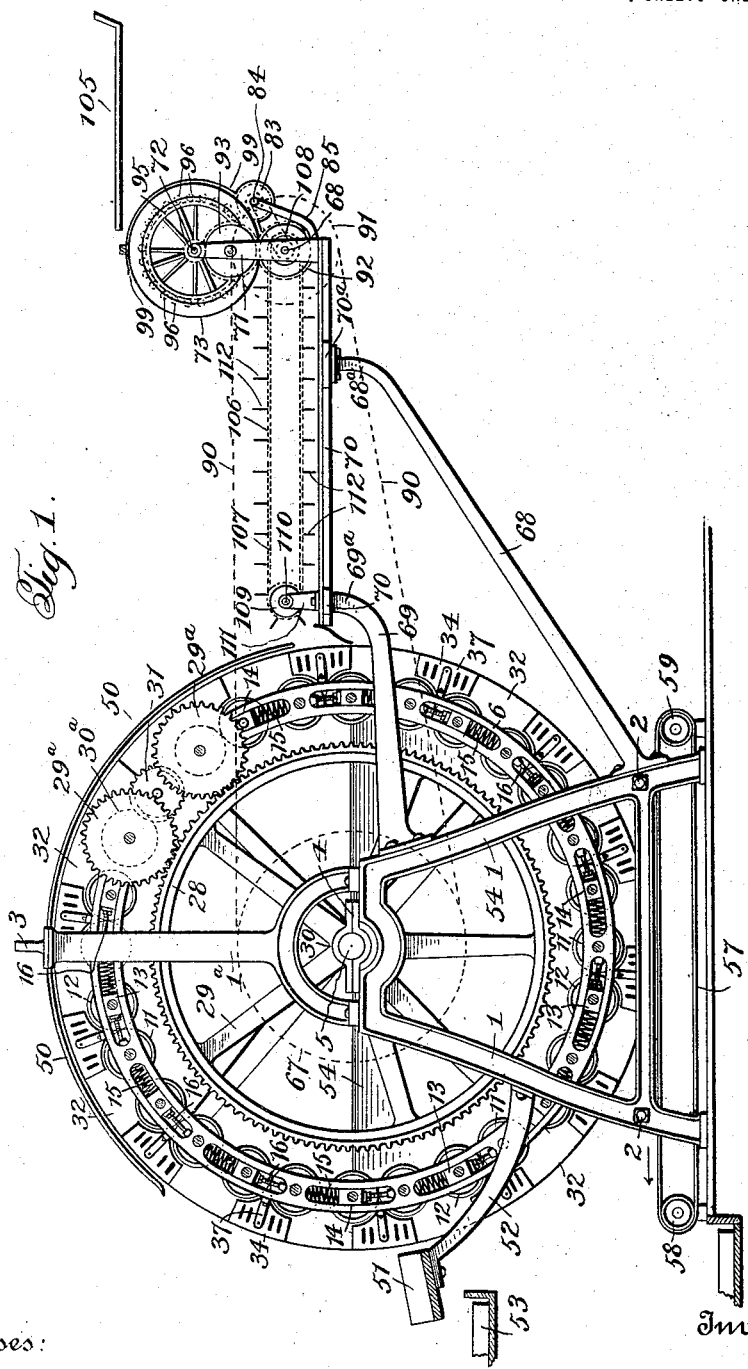

W. H. LEISTER & F. L. HERING.
HUSKING MACHINE.
APPLICATION FILED OCT. 21, 1912.

1,201,476.

Patented Oct. 17, 1916.
7 SHEETS—SHEET 1.

Witnesses:
Jas E. Hutchinson
Gertrude Wedemeier

Inventors:
William H. Leister
Fenby L. Hering,
By Bacon & Milans, Attorneys.

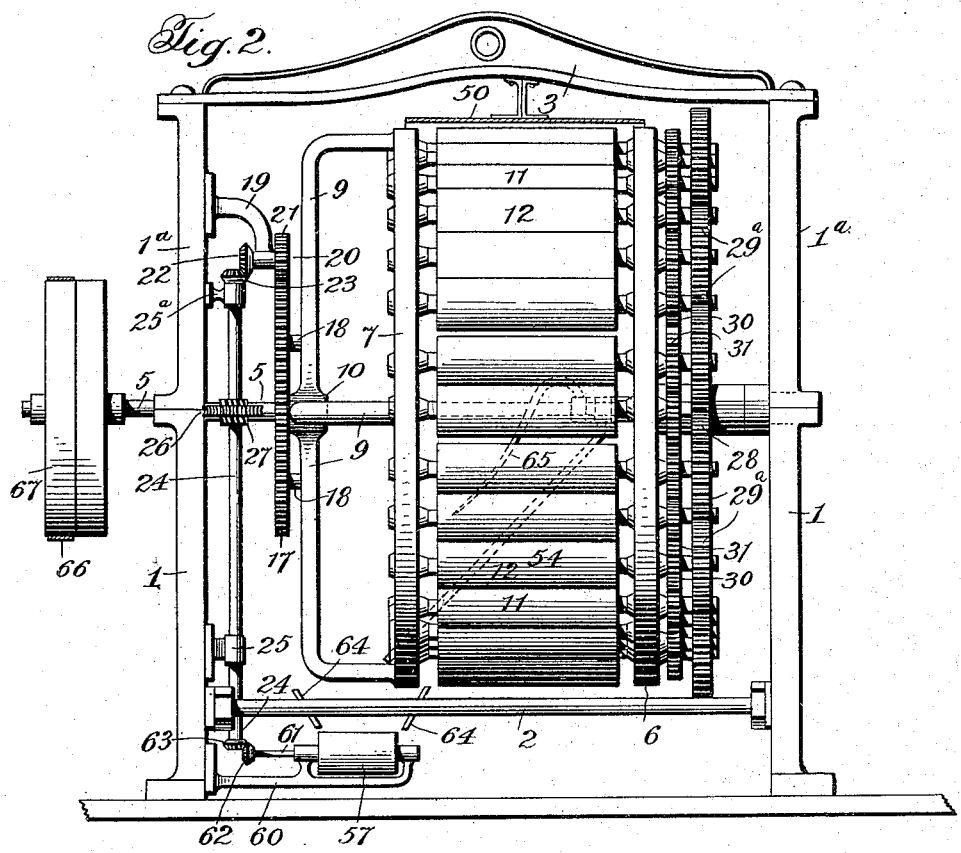
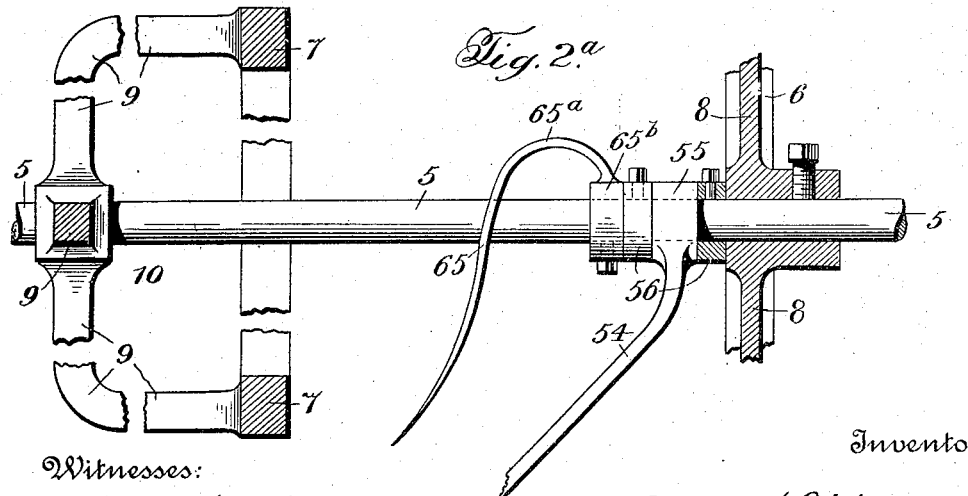

W. H. LEISTER & F. L. HERING.
HUSKING MACHINE.
APPLICATION FILED OCT. 21, 1912.
1,201,476.
Patented Oct. 17, 1916.
7 SHEETS—SHEET 3.
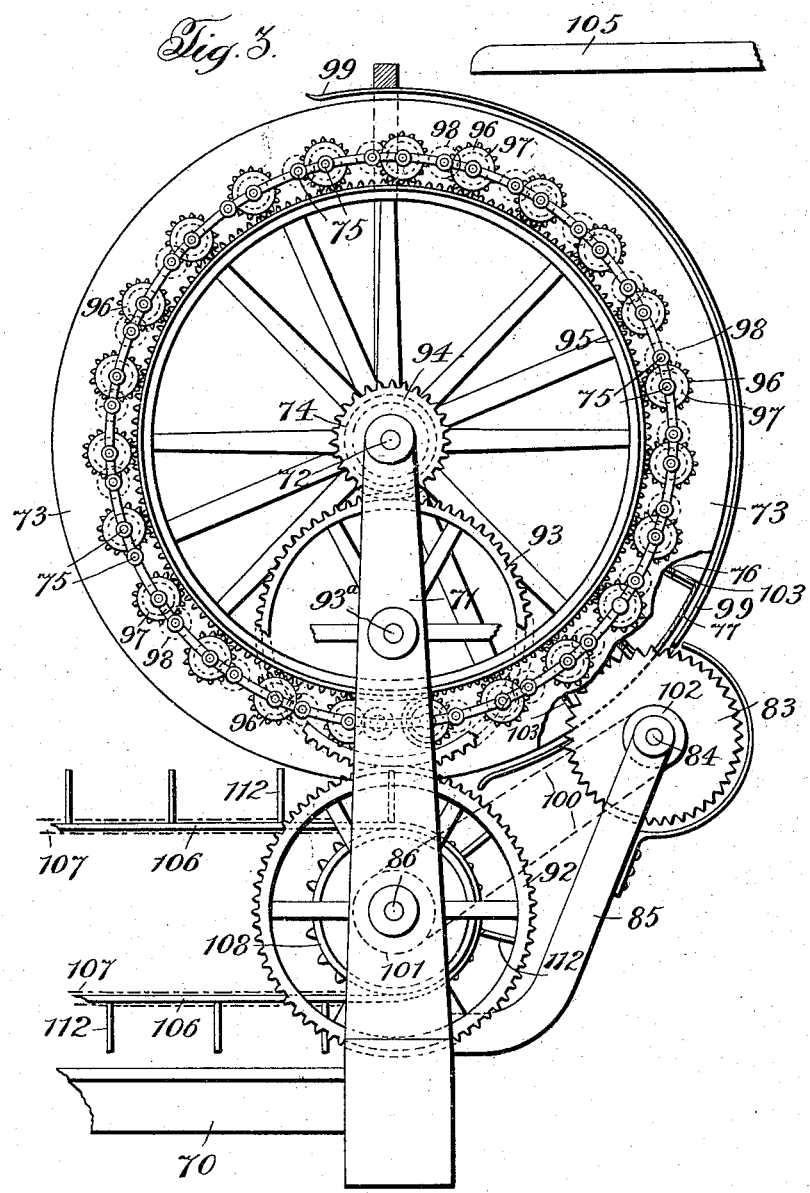

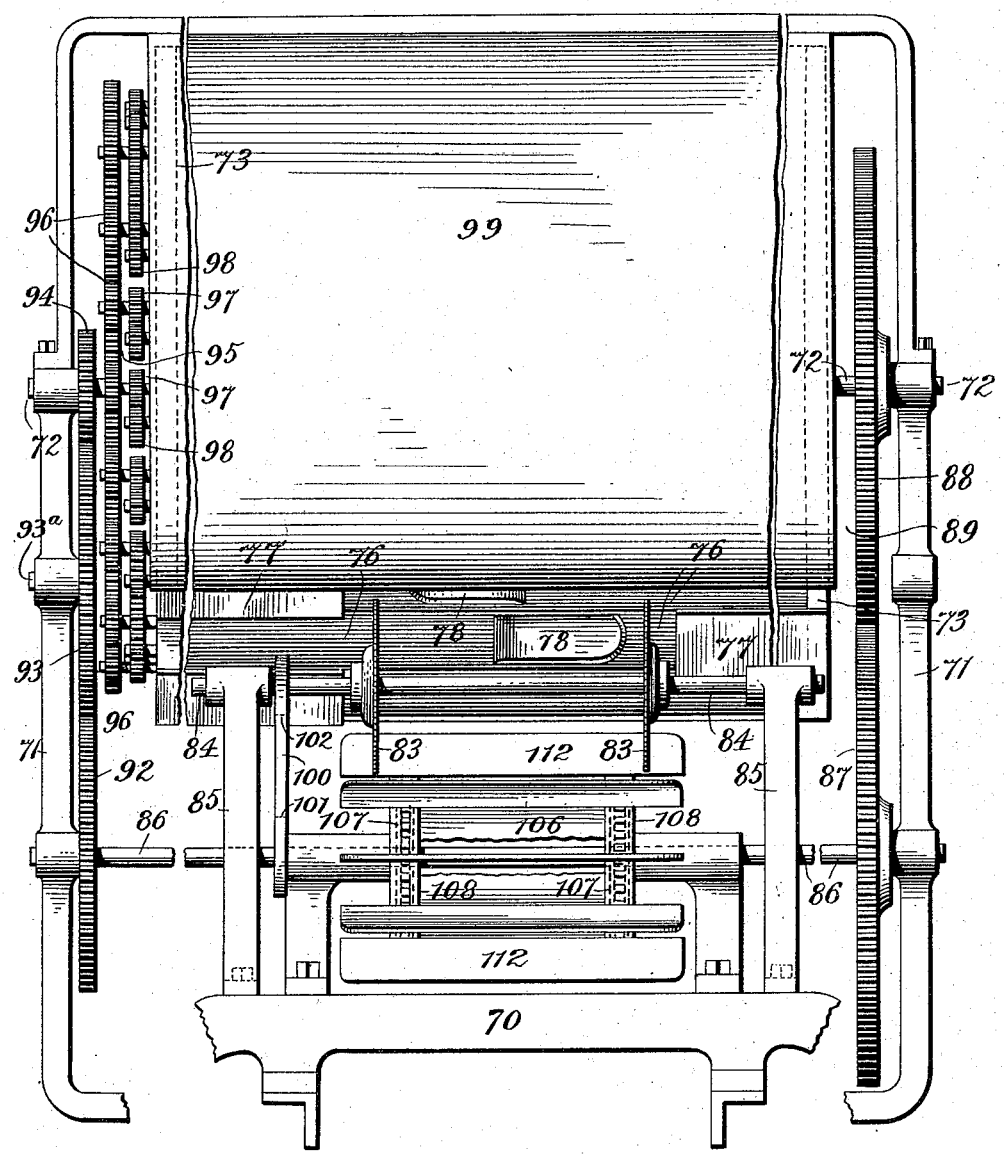

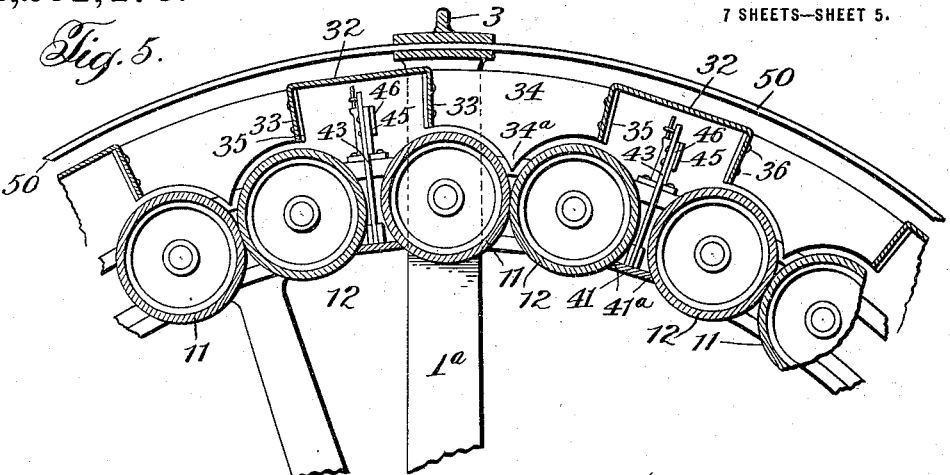
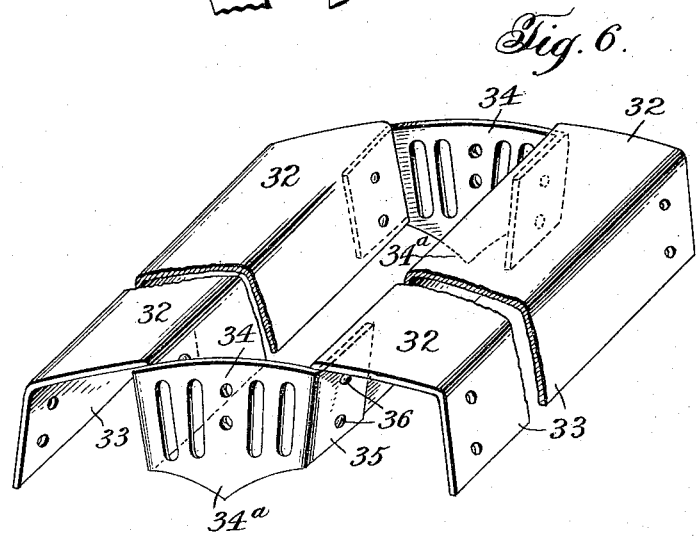
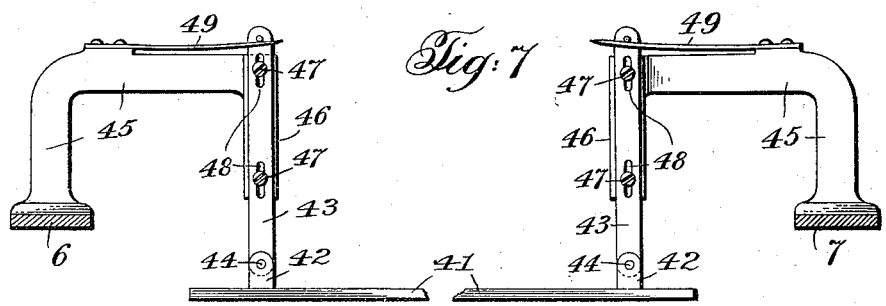

W. H. LEISTER & F. L. HERING.
HUSKING MACHINE.
APPLICATION FILED OCT. 21, 1912.
1,201,476.
Patented Oct. 17, 1916.
7 SHEETS—SHEET 6.
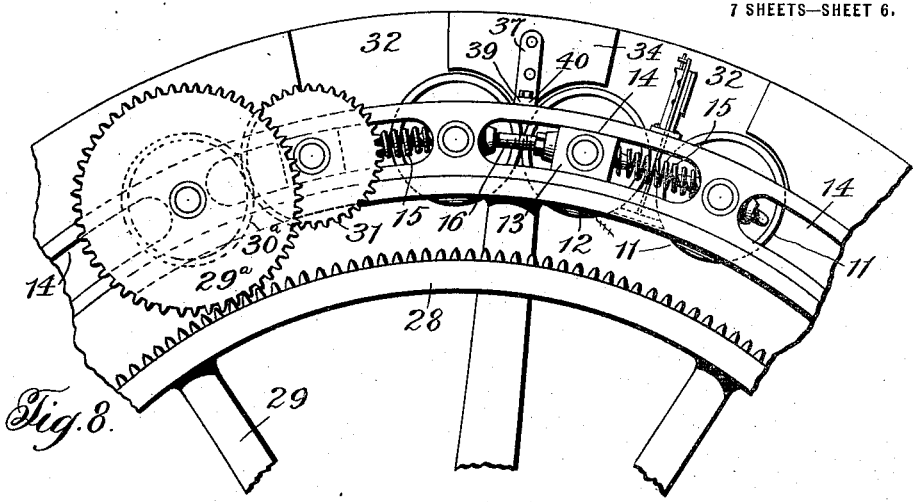
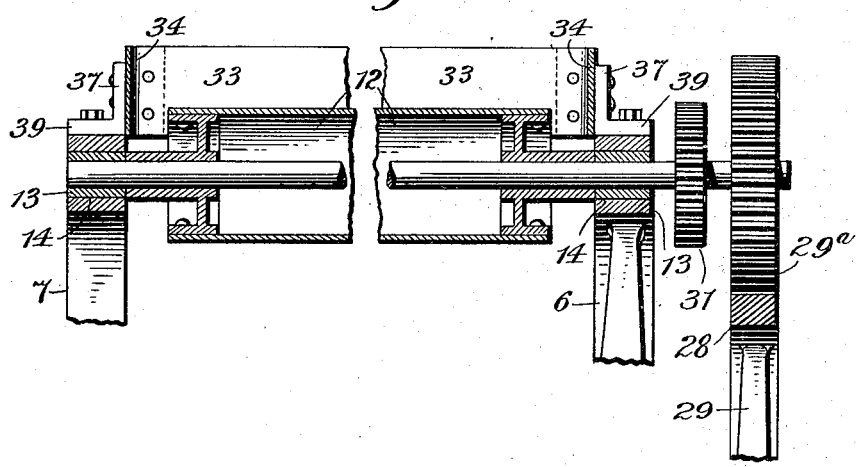

W. H. LEISTER & F. L. HERING.
HUSKING MACHINE.
APPLICATION FILED OCT. 21, 1912.
1,201,476.
Patented Oct. 17, 1916.
7 SHEETS—SHEET 7.
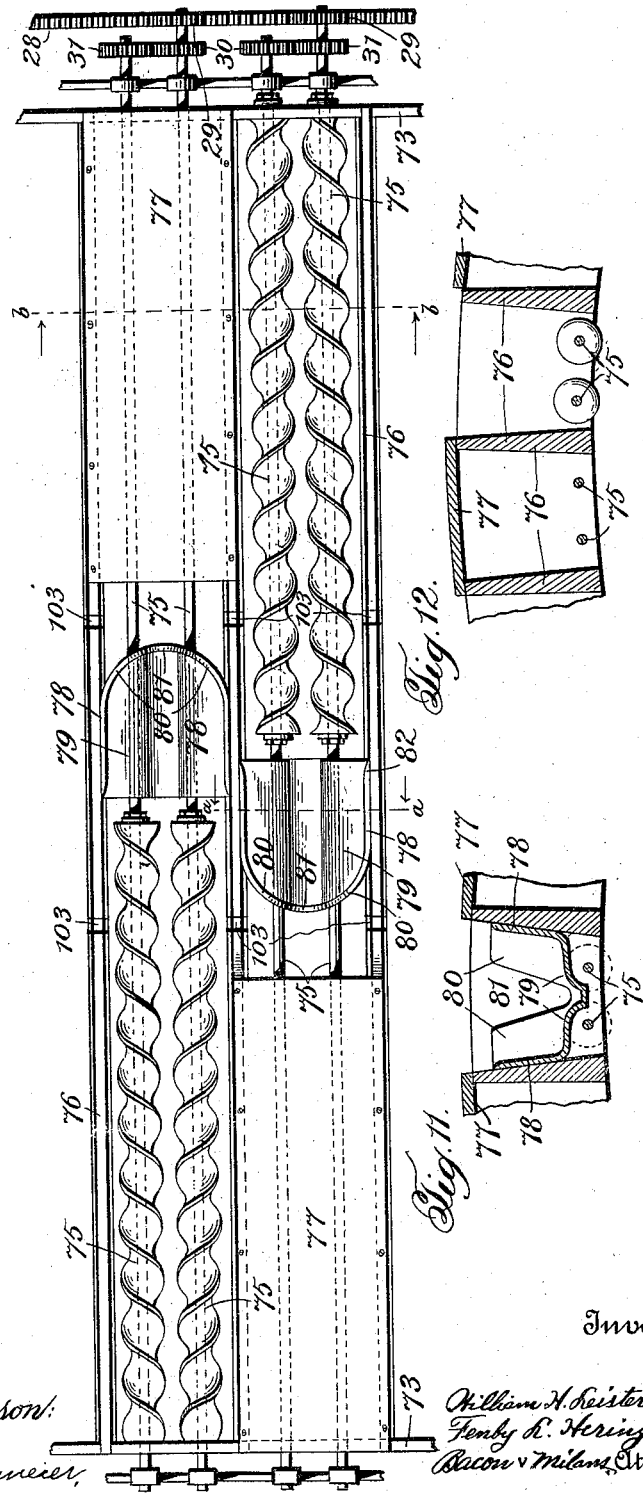

UNITED STATES PATENT OFFICE.

WILLIAM H. LEISTER AND FENBY L. HERING, OF WESTMINSTER, MARYLAND, ASSIGNORS, BY DIRECT AND MESNE ASSIGNMENTS, TO THE KNAPP HUSKER COMPANY, OF BALTIMORE, MARYLAND, A CORPORATION OF MARYLAND.

HUSKING-MACHINE.

1,201,476.  Specification of Letters Patent.  Patented Oct. 17, 1916.

Application filed October 21, 1912. Serial No. 726,895.

*To all whom it may concern:*

Be it known that we, WILLIAM H. LEISTER and FENBY L. HERING, citizens of the United States, residing at Westminster, in the county of Carroll and State of Maryland, have invented certain new and useful Improvements in Husking-Machines, of which the following is a specification, reference being had therein to the accompanying drawing.

The present invention relates to husking machines of a character more particularly designed for green corn husking, although not limited to such use.

Many means have heretofore been devised for husking purposes, but most of these have proven commercially impracticable and unsuccessful to such an extent as to preclude the universal adoption thereof as economical and efficient machines for green corn husking, primarily because the processes were more or less unsanitary, a considerable proportion of the stock could not be thoroughly husked, and sliked, and the corn became bruised or mutilated, thus rendering it unfit for canning purposes.

It is the object of the present invention to provide a machine of the character stated that will meet existing conditions, by overcoming the prior difficulty in obtaining a thorough husking of each individual ear of the supply, and to accomplish this in a more economical manner and with less likelihood of injuring the corn than possible with prior machines.

The machine being, as stated, more particularly adapted for husking green corn, such as is ordinarily hermetically sealed by the canners, it is very desirable to do away with hand labor so far as is possible, and with this in mind, the present invention is of such a character that the corn from the time of its introduction into the machine with its connected husks, until the husked ears are discharged, does not come in contact with the hands of the operators, and thereby the operation is rendered more sanitary, which, as will be appreciated, is an important characteristic of the invention.

In carrying out the principles of the invention, we provide novel and efficient husking instrumentalities including co-acting elongated rotatable husking rolls, the relative position of which, in their action upon the ears, is constantly changing to the end that large and small ears alike will, at one time or another, in the operation of the rolls, be engaged thereby and cleanly severed from the ear.

The invention also includes novel means whereby the individual ears are accurately spaced one from another in the husking operation with the result that the husking of one ear will not interfere with the thorough husking of the others.

The invention further embraces ear butting mechanism, novel and efficient means for feeding the stock of corn to the ear butting mechanism, and novel and efficient means for feeding the butted ears to the husking mechanism.

More particularly, the invention comprises a rotary cylinder or reel, the outer periphery thereof forming a carrying medium in the form of elongated husking rolls extending from side to side of the reel, transfer mechanism for accurately spacing and feeding the ears to the rolls in succession, and a double feed device for supplying said transfer mechanism, which said device has associated therewith means for removing the butt end of the ear.

Many other means and novel details in the construction and arrangement of parts will be more particularly referred to in the description to follow which, for a clear understanding of the invention, should be read in connection with the accompanying drawings, forming a part hereof, and wherein is disclosed for the purpose of illustration, a convenient and satisfactory embodiment thereof.

In the drawings: Figure 1 is a side elevation of the machine, Fig. 2 is a front elevation of the husking reel and closely associated parts, Fig. 2ª is a detail enlarged of the husking reel shaft and connected parts, Fig. 3 is an end view of the ear butting mechanism enlarged and transfer mechanism, the latter being cut away, Fig. 4 is a front elevation of the same, Figs. 5, 6, 7, 8 and 9 are enlarged detail views of parts of the husking mechanism removed, Figs. 10, 11 and 12 are enlarged detail views of parts of the ear butting mechanism removed.

With more particular reference to the drawings, wherein like reference numerals refer to corresponding parts throughout the several views; suitable upright supports or standards 1 are provided one at each side of the machine, the same being suitably braced and connected to one another as by a transversely extending brace bar or bars 2, at the base and an upper transversely extending brace bar 3 projecting between and supported on upward extensions 1ª of the standards 1. The framework just described constitutes the supporting medium for the main parts of the machine, including the ear butting means, the conveying appliances and the husking mechanism.

The husking mechanism will first be described.

The standards 1 form supports for suitable journal boxes 4 adapted to constitute bearings for a transversely extending shaft 5, which said shaft forms a support for the husking mechanism. This mechanism preferably comprises an annular or circular series of elongated rolls arranged in pairs and constituting the outer periphery of a suitable cylinder or reel. The cylinder has suitable side rims 6 and 7, the rim 6 having a hub sleeved on the shaft 5, and connecting spokes 8 between the hub and rim. The rim 7 at the opposite side of the cylinder has suitable off set spokes 9 connecting at their inner ends with a hub 10 also loosely sleeved upon the shaft 5. The purpose and function of the off set spokes 9 will later appear.

As before stated, the husking members are preferably arranged in pairs and each pair comprises rolls adapted to rotate in opposite directions whereby to engage the husk between the surfaces thereof and draw the same from off the ear. These rolls are each preferably formed of metal such as brass and are hollow, one roll 11 of each pair being mounted in stationary bearings in the rims 6 and 7, while the coöperating roll 12 is mounted in suitable movable journal boxes 13, the latter slidably fitting in guide ways 14 in said annular rims 6 and 7. A spring 15 is interposed in said guide ways 14 adapted to engage at one end the rear wall of the guide way, and at its opposite end, said movable journal box 13, to the end that the rolls 12 will be yieldably forced into operative relation with said rolls 11. The inward movement of the rolls 12 due to said spring pressure, is determined by an adjustable screw or bolt 16 adjustably secured at one end in suitable bearings on the rims and adapted at its opposite end to loosely engage against and constitute an abutment for the movable journal box 13. It is therefore seen that the rolls 11 and 12 will be accurately positioned relatively to one another, whereby the most satisfactory husking operation will be performed and the yieldable characteristic of said rolls prevents undue shock or severe strain on the bearings for the rolls, as the husks pass therebetween.

The operating mechanism for the reel and husking rolls preferably comprises the following parts: It is very desirable to rotate the husking rolls at an increased speed relative to the rotation of the cylinder as a whole in order to obtain the best results in the husking operation, and with this in view, suitable speed changing mechanism is interposed between the drive shaft 5 and the shafts of the various husking rolls. To this end, a master gear 28 is suitably supported from and rotatable with the shaft 5, through the medium of spokes 29 mounted upon a suitable hub 30 keyed to said shaft 5. Adapted to mesh with said master gear 28 are suitable gear wheels 29ª one for each of the rolls 11 and fixedly connected to the latter in any desired manner. An auxiliary gear wheel 30ª is fixedly connected to the side of the gear wheels 29ª of the rolls 11 which said gears 30ª are adapted to mesh with a coöperating gear 31 on the spring held rolls 12 when these rolls are in normal position. It will be observed in this connection that it is not absolutely necessary for husking purposes that the gears 30 and 31 be always in mesh, and as a matter of fact, said gears will not always be in mesh because of the yieldable characteristic thereof, but the husking will be continued nevertheless since the husks will frictionally engage between the rolls and the spring held rolls will therefore rotate by friction.

It will be noted that since the husking rolls rotate at a very high speed, the cylinder as a whole would soon pick up, and as a check or controller for the cylinder, we preferably employ the following construction: 17 is a gear wheel loosely mounted upon the main drive shaft 5 and secured to the spokes 9 of the rim 7 in any desired manner, as by studs 18. An overhanging bracket 19 secured to one of the upward extensions 1ª of the standard 1 is adapted to form a bearing for a stub shaft 20, supporting at one end a pinion 21 adapted to mesh with the gear wheel 17, and said stub shaft having at its opposite end a bevel gear 22 adapted to mesh with a similar gear 23 at the inner end of a vertically disposed shaft 24 loosely mounted in bearings 25 and 25ª projecting from the sides of the adjacent upright support 1 and extension 1ª as more clearly illustrated in Fig. 2. Keyed or otherwise secured to the shaft 24 is a suitable worm gear 26, while secured to the drive shaft 5 is a worm 27 adapted to mesh with said worm gear 26. It will be observed that in the rotation of the shaft 5, the gear connection imparts rotary movement to the shaft 24 and in turn to the stub shaft 20, which latter, through the medium of the pinion 21 and gear wheel 17 will rotate the husking reel.

In operation, rotary movement being imparted to the reel as a whole in the manner above described, and independent rotary movement being imparted to the husking rolls, an ear of corn to be husked is positioned between the rolls of each pair comprising the spring held and coöperating fixedly mounted rolls, the action being to rip the husks between the rolls and draw the same into the interior of the cylinder reel, and because of the rotation of the reel, it will be observed that the relative position of the rolls is constantly changing to the end that the rolls act upon the husks at relatively different angles with the result that ears, regardless of their size will at one time or another, assume a position where the husks will be gripped between the oppositely disposed rolls. As the cylinder revolves, the movement of the ears as they rotate on either side of the center of the cylinder is at once impeded and slowly reversed, and while undergoing this reversal of motion, increased friction is applied to the husks, thereby stripping all of the remaining particles of the husks and silk. Since the periphery of the cylinder formed by the husking rolls is intended to constitute a carrying medium for the ears during the husking thereof, it is desirable to provide suitable supports in connection with said rolls whereby to maintain the ears in proper relation thereto and to prevent their separation from the cylinder; also to maintain the ears in separated relation relative to the other ears. With these objects in view, we provide suitable pockets, one for each pair of husking rolls, which pockets are connected by a housing or guard plate which overlies the non-acting portions of adjacent rolls.

The means for maintaining the ears in proper relation to the rolls conveniently comprises segmental shaped guard plates 32 which project from side to side of the reel and have inwardly projecting sides 33, which sides incline outwardly toward their free edge. The sides 33 of adjacent plates are connected to one another through the medium of suitable end plates 34, the lower edge 34ª of which end plates incline from opposite sides inwardly to the center thereof, whereby to conform to the curvature of the husking rolls. Flanges 35 of said end plates overlie and are connected to the inner surface of the sides 33 in any desired manner as by rivets or bolts 36. The plates 32 are supported from the annular rim members 6 and 7 through the medium of brackets 37 secured to the end plates 34, and having off set feet 39 removably secured to the rims as by bolts 40. It will be seen that the space between the adjacent sides 33 of the respective plates 32 forms a pocket for the ear to be husked, said pocket having as its base or bottom, the husking rolls, and said pockets being inclosed at the ends by the end plates 34. The inclined side walls 33 of the pockets readily position the ear in proper relation to the husking rolls, and the side flanges 35 of the end plates being secured to the inner surface of the plates 33, offer no protuberances or obstructions over the inner surface of said side walls of the pockets. The plates 32 form the housings before mentioned, which overlie the non-acting portions of the rolls.

It is very desirable to provide means for keeping the husking rolls free from husks or any silk which may adhere thereto, and this without the necessity of bringing into play any cleansing material which might tend to injure the corn, and with this in view, we provide suitable scraping means between the respective rolls, which said scraping means are preferably supported at a point within the housing formed by the guard plates 32, and are adapted to engage the rolls at a point where their motion is upward and non-husking. The scraping means conveniently takes the form of an elongated relatively flat bar 41 having opposite beveled edges 41ª one for each adjacent roll. Projecting upwardly from the upper surface of the bars 41 are suitable ears 42 adapted to receive the lower end of upright supports 43 secured to the ears 42 as by pintles 44. 45 are overhanging brackets supported from the rims 6 and 7 respectively, said brackets terminating at their inner ends in upright bars 46, overlying the supports 43 and having a pin and slot engagement 47—48, therewith, to permit relative vertical movement or play. A spring member 49 is secured, one to each bracket 45, at one end and engages the upright supports 46 adjacent their upper end in any desired manner, thereby tending to hold the scraper member 41 in normal operative position while at the same time permitting said scraper to yield as occasion demands.

A suitable guard plate 50, segmental in shape, and yieldable upon itself, overlies the upper portion of the cylinder and is preferably secured intermediate its ends as by the overhanging bracket 3 supported from the extensions 1ª of the standards 1. The purpose of this plate is to assist in supporting the ears upon the rolls in the rotary movement of the reel until after the husking operation, at which time the ears will be free to discharge by gravity. A suitable chute 51 is provided in the path of the discharged ears, said chute being supported from the standards 1 by bracket members 52. The chute 51 inclines downwardly so as to deliver, by gravity, onto a suitable drag or conveyer 53 of any desired construction.

In order to keep the interior of the cylinder free from husks, we provide within the cylinder, a suitable discharging chute 54 which latter may be mounted on the shaft by a suitable sleeve portion 55 loosely engaging over the shaft so as to permit independent free rotation of the shaft, and collars 56, one to each side of said sleeve fixedly connected to the shaft tend to hold the chute from sidewise movement. The chute 54 inclines downwardly and outwardly to a position without one side of the cylinder, and is supported at its lower end by loosely engaging over the inner surface of the rim 7. The chute will be held in position by its own weight aided by the weight of the husk traveling thereover.

Because of the fact that the supports 9 for the rim 7 are laterally off set, the said supports offer no obstruction to the free discharge of the husks, which latter fall, by gravity, from the chute directly into a suitable conveyer conveniently taking the form of an endless belt 57 supported at one end upon a suitably supported pulley 58 and at its opposite end upon a similar pulley 59, the shaft of which latter is mounted upon a suitable bracket 60, and has an extension 61 terminating in a beveled pinion 62 adapted to mesh with a similar pinion 63 at the lower end of the vertical shaft 24 before described. In this way, the conveyer 57 receives its movement also from the main shaft 5.

Suitable side guides 64 may be provided above the conveyer 57 and extending longitudinally of the lower end of the chute 54, whereby to assist in the delivery of the husks to said conveyer 57.

A suitable wiper 65 comprising a spring arm with a curved portion 65$^a$ is secured by a collar 65$^b$ to the shaft 5 at a point within the cylinder for rotary movement with the shaft so as to assist in maintaining the interior of the cylinder free from husks. By reason of the peculiar construction of the wiper, the husks will be engaged and directed downwardly toward the chute, while at the same time, in the rotary movement of the wiper, the same will not engage or otherwise injure, or be injured by, the chute.

The main power for the machine may be derived from any suitable source as through the medium of a power driven belt 66 connected to the pulley 67 fixedly connected to the shaft 5. The shaft 5 also constitutes the main drive for the feeding mechanism to be now described.

The corn feeding mechanism is conveniently supported from the main framework. Rearwardly extending bracket arms 68 and 69 project from one side of the legs 1 and terminate in upward extensions 68$^a$ and 69$^a$ respectively, adapted to support elongated horizontally extending angle bars 70, the latter being connected to one another by transverse brace bars 70$^a$. The structure just described forms a substantial support for the mechanism for feeding the ears to the butting mechanism as well as for the mechanism which spaces the butted ears and delivers the same from the butting mechanism to the husking mechanism. Positioned at the rear end of the supporting member 70 and secured thereto, in any desired manner, are upright bracket arms 71 constituting at their end a bearing for a longitudinally extending shaft 72 projecting transversely of the machine, which said shaft constitutes a support for the rotary feed reel about to be described.

The feeding reel is provided with end supports or rims 73 having central bosses 74 loosely mounted on the shaft 72. An annular series of elongated shafts 75 are arranged in pairs and project between the end supports or rims 73, the shafts being mounted in said supports for rotary movement, and projecting through and to the outside of the same. Each pair of said shafts 75 is provided with a screw or spire, the spire of one of the shafts of each pair being a left hand one, and the coöperating spire, a right hand one, to the end that they coöperate together to constitute a support, and means for feeding longitudinally of the shafts, the ears to be husked. The spires of one pair of shafts project from one end thereof to a point adjacent the center thereof, and the spires of the next succeeding pair of shafts project from the opposite end of said shafts to a point adjacent the center thereof, whereby the succeeding pairs of spires alternately feed from opposite ends of the reel toward the center thereof.

Pockets are conveniently provided in operative association with the spires whereby to support the ears and prevent their falling out of the reel while maintaining the same in proper position relative to the spires. Said pockets are formed by oppositely disposed side plates 76, the opposite surfaces of which plates incline, whereby one plate will coöperate with the next adjacent one to properly center the ears. The side plates 76 are supported from the rims 73 in any desired manner and are connected at their upper ends to segmental plates 77 which latter constitute hoods or housings projecting from the side of the reel to a point short of the center thereof. The said hoods inclose that portion of the shafts 75 which are devoid of spires. The side plates 76 form the sides of the pockets while the spires form bases thereof. Adjacent the inner end of each pair of spires are suitable end or gaging pockets, the opposite sides 78 of which curve inwardly so as to form a rounded bottom 79, which latter is arranged in substantial alinement with the upper periphery of the spires. The rear end 80 of each pocket is curved and has an opening 81 conveniently substantially V-shaped whereby to receive the butt of the ear and automatically engage the same. The sides 78 of the gaging pockets have flared edges as indicated at 82 whereby to facilitate the entrance of the ears into the pockets. Cutting members, conveniently taking the form of rotary saws 83 are mounted upon a shaft 84 supported upon an upwardly projecting bracket 85 secured in any desired manner to the angle iron 70. The said saws 83, there being two provided, one adjacent the outer end of each of the gaging pockets and to the outside thereof, are adapted to, in the rotary movement of the reel, sever the butt end of the ear which projects beyond the closed end of the gaging pocket.

The operating mechanism for feeding the reel will now be referred to.

It is, of course, desirable to feed the ears longitudinally of the reel at a greater speed than the reel is rotated, in order that the ears will reach the butting instrumentalities prior to the reel reaching that position when the ears will be discharged from the reel. With this in view, we provide a main shaft 86 projecting between the upwardly projecting bracket arms 71 and having suitable bearings therein, the shaft being in substantial vertical alinement with the supporting shaft 72. At one end of the shaft 86 is a gear wheel 87 fixed to the shaft and adapted to mesh with a gear wheel 88 fixed to one of the rims 73 at that side of the machine preferably through the medium of connecting pins or the like 89. This gear 88 is loosely mounted on the shaft 72 and it will be seen that upon rotation of the drive shaft 86, the reel will rotate therewith through the medium of the intermeshing gears 87 and 88. The rotation of the shaft 86 may be effected from any suitable source as through the medium of a belt or the like 90, engaging a pulley 91 on the shaft 86, which said belt receives its movement preferably from the shaft 5 of the husking mechanism above described. Secured to the opposite end of the shaft 68 is a gear wheel 92 adapted to mesh with an idle gear 93 supported upon a stub shaft 93ª, which idle gear meshes in turn with a gear 94 secured to the shaft 72 for movement therewith. A gear wheel 95 is fixedly connected to the shaft 72 at a point adjacent the gear wheel 94 and is adapted to mesh with the pinions 96 secured to the end of one of the shafts 75 of each pair of feed spires. The coöperating shaft of each pair of feed spires receives its movement from the other shaft through the medium of a pinion 97 mounted at one end thereof and adapted to engage a pinion 98 on the other shaft. In this way the shafts 75 of each pair are rotated in opposite directions and at an increased speed relative to the rotary movement of the reel.

A suitable guard plate 99, preferably segmental in shape, is supported from the upright arms 71 in any desired manner, said plate overlying the upper surface of the feeding reel, whereby, when the ears are placed in position on the screw feeds, they will be held in the pockets until after passing into contact with the saws 83, when the butts will be severed, the saws 83 being rotated by a suitable belt 100 mounted at opposite ends upon a pulley 101, on the shaft 68 and a pulley 102 on the shaft 84. The side walls 76 of the pockets of the feed reel are preferably slotted as indicated at 103 whereby to permit the passage into the pockets of the saws 83 in the rotary movement of the reel, and in this same connection it will be observed that should the ears be of unusual length, while one saw is cutting the butt of the ear, the other saw adjacent the opposite end of the ear will sever the tip of the extended ear. A suitable corn supply table 105 is provided, the same being arranged adjacent the top of the feed reel and substantially coextensive therewith, and within ready access of the operators positioned in front of the reel, preferably at each side of the support 70.

The transfer and spacing mechanism preferably includes an endless conveyer 106 having suitable drive chains 107, mounted at one end upon sprockets 108 secured to the drive shaft 86, and at the opposite end upon sprockets 109 supported upon a shaft 110 projecting between brackets 111 on the angle iron 70. The said conveyer has a plurality of blades or wings 112 and the same are constructed and arranged whereby the space between the respective blades will form pockets to receive the butted ears as they fall from the pockets of the feed reel, after said pockets pass the point where the butts are sawed from the ear. It will be noted in this connection, that the pockets on the conveyer 106, discharge adjacent the pockets of the husking reel heretofore described, and the construction and operation of the husking reel, conveyer and feeding reel will be so timed that the pockets will register to the end that the ears are continuously fed, one to each pocket of the husking reel.

The general operation of the machine may be reviewed as follows: The various parts of the machine, including the feeding mechanism, ear butting mechanism, transfer mechanism, and the husking mechanism are so arranged with respect one to the other, that each of said parts coöperate with the other, to the end that the machine is automatic in operation from the time of the entrance of the ears with the husks thereon to the feeding reel, to the time of the discharging of the thoroughly husked ears from the husking reel. During the several steps, it is not necessary for the hands of the operator to touch the corn at any time, thereby rendering the machine thoroughly sanitary in this respect. The various parts are conveniently mounted upon a common support or frame, and the movable parts are also preferably driven from a common source. The machine, having been started, and the table 105 having been supplied with a stock of corn to be husked, an operator is preferably positioned at each side of the machine.

The feeding mechanism is double-acting, that is to say, one operator takes an ear from the table 105 and places it between one pair of feed screws or spires at one side of the feeding reel, while the other operator places an ear between the feed screws or spires of the next succeeding pair of feed screws or spires at the opposite side of the reel. The feed spires conduct the ears, the butt ends of which are positioned toward the center of the reel, onto the ends of the pockets, the butts of the ears automatically seating in the V-shaped openings 81 at the ends of said pockets or in position to be engaged by the butting saws 83. The feed spires operating at an increased speed relative to the rotary movement of the reel, the ears will readily assume the position just mentioned before the reel rotates into a position where the butted ends of the ears will be engaged by the saws. After said butts have been severed, the ears readily fall out of the pockets of the feeding reel into position to be engaged between the blades 112 of the conveyer 106 and transferred one at a time from the butting mechanism into the pockets of the husking reel. But one ear, at a time, is preferably fed into each of the pockets of the husking reel, and this makes possible the thorough husking of each individual ear without any interference of another ear being husked at the same time. The pockets of the husking reel will readily position the ears between the husking rolls 11 and 12, and in the rotary movement of the reel, the husk of the ears will, regardless of the size thereof, at one time or another, be engaged between the husking rolls and severed from the ear. This is made possible by reason of the fact that the relative position of the rolls of each pair of husking members is constantly changing by rotary movement of the reel, as has been seen. The husked ears, in the continued movement of the reel, will be discharged into the chute 51 and deposited onto the conveyer 53. The husks which are drawn into the interior of the husking cylinder will be dropped upon the discharge chute 54, the discharging action being aided by the rotary wiper 65, and from the discharge chute the husks will be deposited upon the conveyer 57.

What we claim is:—

1. In a husking machine comprising a rotary member mounted upon a horizontal axis, a plurality of pairs of husking rolls carried by the member, means for rotating the rolls of each pair in opposition, one to the other, and relatively fixed means for retaining the material to be husked in operative relation with the rolls.

2. In a husking machine comprising a rotary member mounted on a horizontal axis, a plurality of pairs of husking rolls mounted on horizontal axes carried by the member, means for rotating the rolls of each pair in opposition one to the other, and a substantially segmental hood having a substantially smooth surface arranged to the exterior of the rotary member overlying a plurality of said rolls for retaining the material to be husked in operative relation to the husking rolls.

3. In a husking machine, the combination of a horizontally rotatable frame having a series of peripheral pockets and a pair of oppositely acting rotatable husking rolls in each of said (separate and distinct) pockets.

4. In a husking machine, the combination of a rotatable frame mounted on a horizontal axis having an annular series of rotary husking rolls projecting between the sides, and partition members projecting between the sides and overlying the sides of the rolls whereby to form exterior pockets.

5. In a husking machine, the combination of a rotatable frame having an annular series of husking rolls arranged in pairs, and a peripheral pocket on the frame for each pair of rolls and a stationary curved guide adapted to overlie the material when in engagement with the rolls and said pocket.

6. In a husking machine, the combination of a rotatable hollow reel having a plurality of rotary horizontally extending husking rolls arranged about the periphery thereof, the interior of the reel being adapted to receive husks, and said rolls forming an exterior support and carrying medium for the ears to be husked and outwardly projecting partition members separating each adjacent pair of rolls.

7. In a husking machine, the combination of a rotatable hollow reel having a plurality of rotary horizontally extending husking rolls arranged about the periphery thereof, the interior of the reel being adapted to receive husks, and said rolls forming an exterior support and carrying medium for the ears to be husked, and means for feeding the ears to the outer periphery of the reel in accurate position on said rolls.

8. In a husking machine, the combination of a rotary reel, the outer periphery thereof being formed by horizontally extending rotatable husking rolls, and outwardly projecting partition members separating each adjacent pair of rolls, and means for feeding ears to be husked to the outer periphery of the reel one at a time to each pair of rolls.

9. In a husking machine, the combination of a rotary reel, the outer periphery thereof being formed by horizontally extending rotatable husking rolls, each pair of rolls being separated by a partition, and means for feeding ears to be husked to individual pockets formed by said partition in the outer periphery of the reel, the reel being hollow, whereby it constitutes a receiving chamber for the husks fed thereinto by the rolls.

10. In a husking machine the combination of a rotary reel, the outer periphery thereof being formed by horizontally extending rotatable husking rolls, peripheral partitions separating each pair of rolls and a segmental-shaped guard plate overlying said rolls.

11. In a husking machine, the combination of a rotary reel mounted on a horizontal axis, the outer periphery thereof being formed by horizontally extending rotatable husking rolls, means for feeding ears to be husked to the outer periphery of the reel, the reel being hollow, whereby it constitutes a receiving chamber for the husks fed thereinto by the rolls, and a chute within the reel to receive the husks and discharge the same to the outside of the reel.

12. In a machine of the character described, the combination of a rotatable reel mounted on a horizontal axis and having at its periphery longitudinally rotatable husking rolls, means for feeding ears to the outer surface of the reel formed by said rolls, said rolls communicating with an interior husk receiving chamber of the reel whereby, in the rotation of the reel, said rolls constitute carrying supports for the ears, and discharging means projecting into the interior of the reel for delivering the husks of the ears from the interior of the reel.

13. In a machine of the character described, the combination of a rotatable reel mounted on a horizontal axis and having at its periphery longitudinally rotatable husking rolls, means for feeding ears to the outer surface of the reel formed by said rolls, said rolls communicating with an interior husk receiving chamber of the reel, whereby, in the rotation of the reel, said rolls constitute carrying supports for the ears, discharging means leading from a point adjacent the interior of the cylinder to a point outside of the cylinder for delivering the husks of the ears from the interior of the reel, and a conveyer arranged below the reel and movable transversely to the axis of the reel and adapted to receive the husks from the discharging means.

14. In a husking machine, the combination of a rotatable reel mounted on a horizontal axis and having at its periphery, longitudinally rotatable husking rolls, said rolls being arranged in pairs with the rolls of each pair rotating in opposite directions, and means for feeding the ears to be husked separately to each pair of rolls.

15. In a husking machine, the combination of a rotary reel mounted on a horizontal axis and having at its periphery, an annular series of husking rolls arranged in pairs, means for feeding the ears to the outer periphery of the reel into engagement with the husking rolls, and a stationary deflector arranged within the reel for delivering the husks to the exterior thereof.

16. In a husking machine, the combination of a rotary reel mounted on a horizontal axis and having at its periphery an annular series of husking rolls arranged in pairs, means for feeding the ears to the outer periphery of the reel into engagement with the husking rolls, a conveyer arranged without the reel and movable beneath the reel and in a direction transverse to the longitudinal axis of the latter, and means within the reel for feeding the husks from the interior of the reel to said conveyer.

17. In a husking machine, the combination of a rotary reel having at its periphery an annular series of husking rolls arranged in pairs, a conveyer arranged without the reel, means within the reel for feeding the husks from the interior of the reel to said conveyer, and a wiper within the interior of the reel operatively associated with said feeding means.

18. In a husking machine, the combination of a rotary reel mounted on a horizontal axis, said reel having at its periphery a series of husking rolls arranged in pairs, side rims for the reel, and supports for said rims, the support for one rim being laterally offset, a conveyer arranged below the reel between said offset support and the adjacent rim, and means for delivering the husks from the interior of the reel to said conveyer.

19. In a husking machine, the combination of a rotatable reel arranged on a horizontal axis, said reel having a series of husking rolls at its periphery, means for feeding ears to be husked to the exterior of the cylinder and into position on said husking rolls, partitions between each succeeding pair of rolls, means for rotating the reel, and means for rotating the rolls at a relatively increased speed.

20. In a husking machine, the combination of a rotatable reel arranged on a hori-. zontal axis, said reel having a series of husking rolls at its periphery, means for feeding ears to be husked to the exterior of the cylinder and into position on said husking rolls, means for rotating the reel, and means for delivering the ears to be husked one at a time to each pair of rolls.

21. In a husking machine, a rotatable reel having an annular series of husking rolls, a pocket for each pair of rolls, a conveyer for delivering the ears to be husked one only to each pocket and oppositely acting feed devices adapted to discharge the ears to be husked at a common point onto said conveyer.

22. In a husking machine, the combination of husking instrumentalities, and associated feeding mechanism including a conveyer member, and feeding members arranged transversely relative to the conveyer member, said feeding members comprising spiral feeds extending from a point overlying the conveyer outwardly, and said spiral feeds having a point of discharge above said conveyer, said conveyer having means whereby the ears are held separated and are delivered one at a time to the husking instrumentalities.

23. In a husking machine, a rotatable husking reel having an annular series of husking rolls arranged in pairs, a pocket for each pair of rolls, a rotary feed reel having a series of screw conveyers arranged in pairs, and a pocket for each pair, said pockets of the feed reels having a common point of discharge, and a conveyer interposed between the feeding reel and the husking reel, said conveyer being adapted to receive the ears one at a time and to discharge the same, one ear in each pocket of the husking reel.

24. In a husking machine, the combination of a rotatable husking reel having at its periphery an annular series of husking rolls arranged in pairs, means for forming a pocket for each pair of rolls, a supporting frame for said reel, a conveyer adapted to deliver the ears one at a time to each pair of rolls, a support for the conveyer, brackets interposed between the supporting frame of the reel and the support for the conveyer, and ear butting instrumentalities supported from the support for the conveyer.

25. In a husking machine, the combination of a rotary husking reel mounted on a horizontal axis divided into a series of pockets, a pair of husking rolls in each pocket, a rotary feed reel mounted on a horizontal axis, and a horizontally extending transfer mechanism interposed between the feed reel and husking reel, said transfer mechanism being adapted to receive the ears from the feed reel and deliver the same one at a time to the pockets of the husking reel.

26. In a husking machine, the combination of a rotary reel mounted on a horizontal axis, having an annular series of husking rolls arranged in pairs, a pocket for each pair of rolls, means for rotating the reel, and means for rotating the rolls of each pair in opposite directions, and scraping means carried by the wall of said pockets interposed between the non-acting surfaces of adjacent rolls.

27. In a husking machine, the combination of a rotary reel mounted on a horizontal axis, having an annular series of husking rolls arranged in pairs, a pocket for each pair of rolls, means for rotating the reel, and means for rotating the rolls of each pair in opposite directions, and scraping means carried by the wall of said pockets interposed between the non-acting surfaces of adjacent rolls, the scraping means being common to a plurality of rolls.

28. In a husking machine, the combination of a rotatable reel, having an annular series of husking rolls arranged in pairs, the reel having walls mounted on a horizontal axis forming individual pockets for the ears, there being one pocket for each pair of rolls, and a hood or housing overlying the non-acting surfaces of the rolls.

29. In a husking machine, the combination of a rotatable reel mounted on a horizontal axis, having an annular series of horizontally disposed husking rolls arranged in pairs, walls on the reel forming individual pockets for the ears, there being one pocket for each pair of rolls, and a hood or housing overlying the non-acting surfaces of the rolls, and scraper members positioned within the housing and adapted to engage said non-acting surfaces of the rolls.

30. In a husking machine the combination of a horizontal supporting shaft, a plurality of pairs of husking rolls supported from the shaft, means for rotating the shaft, and means for forming a separated pocket for each pair of rolls.

31. In a husking machine the combination of a horizontal supporting shaft, a plurality of pairs of husking rolls supported from the shaft, means for rotating the shaft, and means for positioning an ear in operative position with one pair of rolls and spacing the same from the ears on the remaining rolls.

In testimony whereof we affix our signatures in presence of two witnesses.

WILLIAM H. LEISTER.
FENBY L. HERING.

Witnesses:
FRANK R. CASSELL,
DENTON CHEHA.

Copies of this patent may be obtained for five cents each, by addressing the "Commissioner of Patents, Washington, D. C."